June 29, 1954     R. L. JAESCHKE     2,682,618
CONTROL SYSTEM FOR ELECTRIC SLIP COUPLINGS
Filed Jan. 21, 1952     3 Sheets-Sheet 1

Ralph L. Jaeschke,
Inventor.
Koenig and Pope,
Attorneys.

CONTACTS FULLY CLOSED

CONTACTS PARTLY CLOSED

CONTACTS PARTLY OPEN

CONTACTS FULLY OPEN

June 29, 1954        R. L. JAESCHKE        2,682,618

CONTROL SYSTEM FOR ELECTRIC SLIP COUPLINGS

Filed Jan. 21, 1952        3 Sheets-Sheet 3

Patented June 29, 1954

2,682,618

UNITED STATES PATENT OFFICE 2,682,618

CONTROL SYSTEM FOR ELECTRIC SLIP COUPLINGS

Ralph L. Jaeschke, Kenosha, Wis., assignor, by mesne assignments, to Eaton Manufacturing Company, Cleveland, Ohio, a corporation of Ohio Application January 21, 1952, Serial No. 267,394

23 Claims. (Cl. 310—95)

This invention relates to control systems, more particularly to a control system incorporating an electromagnetic vibrating contact device adapted for smoothly varying the current in a load circuit, and is a continuation-in-part of my copending United States patent application for Control System, Serial No. 258,961, filed November 29, 1951, now abandoned.

Among the several objects of this invention is the provision of a low-cost control system for varying current supplied to a load, such as the field coil of an electric coupling, in accordance with variations in a selected variable condition, as, for example, the output speed of an electric coupling. Other objects include the provision of a control system of the type above described wherein speed-regulating and torque-limiting action is obtained from a control signal that is conveniently and economically obtained; the provision of such a control system having long life and reliability; the provision of a control system having high stability and low tendency to hunt; and the provision of such a control system wherein its parts are not influenced adversely by extraneous conditions such as substantially translatory vibrations of adjacent equipment. For example, it is an object of this invention to provide a control system adapted for mounting on a machine without adverse effects from its operation.

Briefly, these objects are attained by connecting a source of variable-amplitude alternating current through rectifier means to deliver a variable-amplitude pulsating excitation to an electromagnet of an electromagnetic vibrating contact device. The electromagnetic device has a movable contact which is thereby caused to vibrate about a mean position which is at a varying distance with respect to another cooperating contact. The contacts are connected in a power circuit for the load, and the current therethrough is "chopped" into a number of segments corresponding to the frequency of contact vibration, the intervals between conductive periods being varied in order that the average current carried through the contacts is smoothly varied over a wide range. The frequency of pulsation is selected so that the "chopping" effect has nominal influence upon the load current. For this reason an inductive load is desirable and the frequency of pulsation should be greater than the frequency of variation in the selected varying quantity.

The electromagnet may also be provided with a component of excitation that is responsive to the load current, this being in addition to the aforementioned pulsating excitation applied for control purposes. The load-responsive component is supplied in such a manner as to have a degenerative effect upon the operation of the contacts; that is the load-responsive excitation component tends to reduce the load current in response to an increase in the load current, as effected by the pulsating component of excitation. In the embodiment disclosed, a relatively small winding is added to the electromagnet and connected in series with the load circuit. Other features of the invention will be in part apparent and in part pointed out hereinafter.

The invention accordingly comprises the elements and combinations of elements, features of construction, and arrangements of parts which will be exemplified in the structures hereinafter described, and the scope of which will be indicated in the following claims.

In the accompanying drawings, in which several of various possible embodiments of the invention are illustrated:

Similar reference characters indicate corresponding parts throughout the several views of the drawings.

Figure 1:
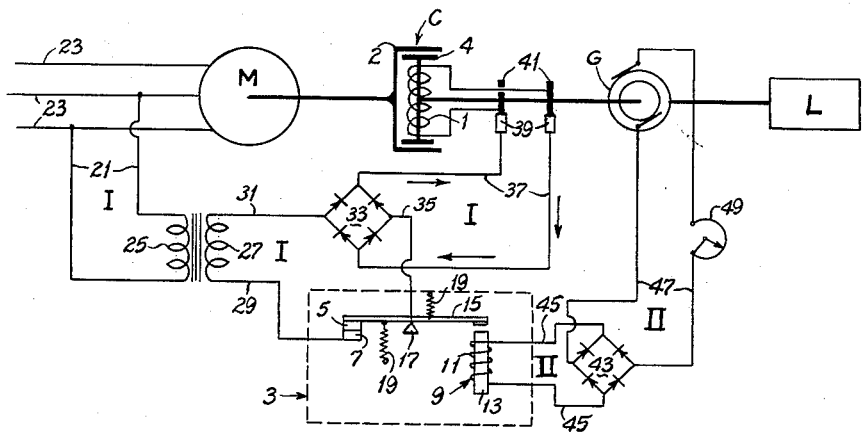
Fig. 1 is a circuit diagram of a control system providing speed regulation of an electric slip coupling.
Figure 2:
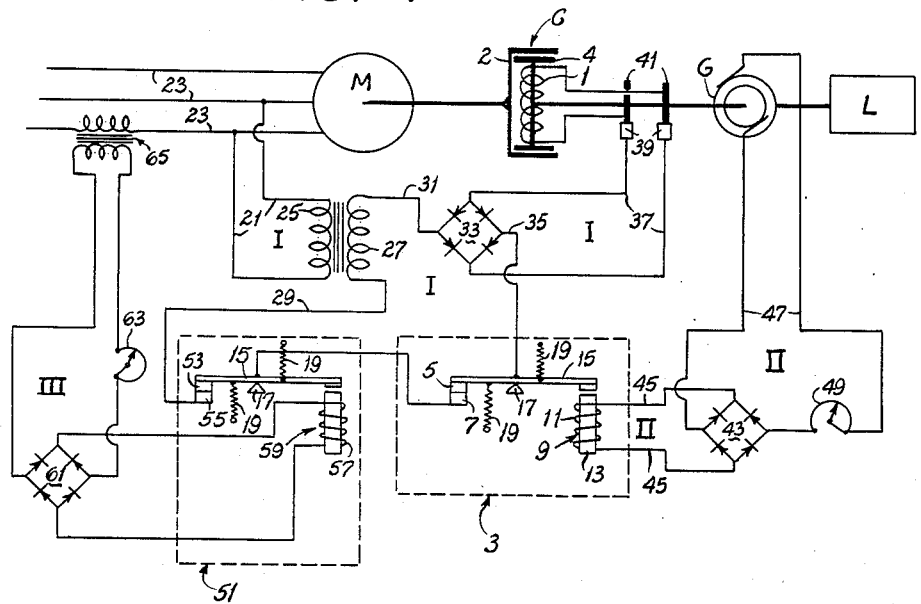
Fig. 2 is a circuit diagram of a control system providing speed-regulating and torque-limiting action for the combination of an A. C. motor and an electric slip coupling.

As illustrative of apparatus for which the control system of this invention is adapted, Figs. 1 and 2 diagrammatically show a variable speed drive. This drive includes a constant speed A. C. motor M, an electric slip coupling C and a load L arranged so that the speed of the load L may be controlled apart from the speed of the motor M by varying the rotary slip at the coupling. The coupling has a driving inductor member 2 mechanically coupled to the motor M and a driven field member 4 mechanically coupled to the load L and carrying a field coil 1. The torque transmitted by the coupling and thereby the slip between the members 2 and 4 is controlled by varying the excitation of the field coil 1.

The control circuit of Fig. 1 is adapted to vary the excitation of the field coil 1 in accordance with a signal obtained from an A. C. generator G which is mechanically coupled to the driven member 4 of the coupling in order to detect speed variations. It will be apparent hereinafter that the control system of this invention is adapted for other types of electrical machines, for example eddy-current dynamometers, and for different types of electrical loads other than such field coils.

Heretofore, a variety of controls has been employed to control the coupling of the variable speed drive described above. For example, in U. S. Reissue Patent No. 22,432, there is shown a control system incorporating grid-controlled gaseous-discharge tubes. Other types of control systems are shown in U. S. Patents Nos. 1,982,461, 2,132,824, and 2,286,777. Although generally satisfactory, such systems sometimes are costly for use with small variable-speed drives. The control of this invention is ideally suited for small variable speed drives because of its low cost, compactness, reliability and long life.

Referring now to Fig. 1 in detail, the control circuit is shown to comprise an electromagnetic vibrating contact device generally designated 3 and enclosed within dotted lines. This device comprises a pair of cooperating switch contacts 5 and 7, of which the contact 5 is adapted to be vibrated by an electromagnet 9. The electromagnet 9 includes a coil 11 wound upon a core 13, and an armature 15 cooperating with the core 13 and carrying the movable or vibrating contact 5. In the form shown diagrammatically in Fig. 1, the armature 15 is pivoted at 17 and spring-biased as indicated at 19 in a direction such that the vibrating contact 5 is normally closed upon the other contact 7.

The electromagnetic vibrating contact device 3 per se does not form a part of this invention, such devices broadly being known in the art. For example, such devices are employed as current and voltage regulators in automotive electric systems. Also, a form of this device particularly adapted to make this control system resistant against external vibrations is disclosed in the copending patent application for Electromagnetic Vibrating Contact Device and Control, of Anthony Winther, Serial No. 259,114, filed November 30, 1951 and eventuated as Patent 2,651,732. Briefly, the field coil 11 should present a relatively low inductance, for purposes to be explained. Further, the vibrating contact 5 and associated armature 15 should be light weight, so as to be adapted for response to a pulsating magnetic field of high frequency, as for example of the order of several hundred cycles per second.

It will be understood that, in the case of automotive voltage or current regulators, the electromagnet and the contacts are connected in the same circuit so that a pulsating current for the electromagnet is obtained from a D. C. current. By reconnecting these current or voltage regulators so that there are separate circuits for the contacts and the electromagnet, they can be used for the system disclosed herein.

In the connections for the control system herein, the contacts 5 and 7 are connected in a load circuit I, and the coil 11 of the electromagnet is connected in a separate control circuit II.

The load circuit I includes connections 21 from A. C. power supply lines 23, which may be the power supply lines for the motor M. The connections 21 lead to a primary 25 of a step-down transformer, the secondary 27 of which is connected by a conductor 29 to one contact 7 and by a conductor 31 to one A. C. input terminal of a bridge rectifier 33. The other A. C. input terminal of the bridge rectifier 33 is connected at 35 to the other contact 5 through the armature 15. The D. C. output terminals of the rectifier 33 are connected at 37 to brushes 39 which cooperate with slip rings 41 for the field coil 1. It will be noted that the switch contacts 5 and 7 are connected in the A. C. portion of the load circuit, this being desirable for improved contact life; for less damage is done to the contacts when they break an A. C. circuit than in breaking an inductive D. C. circuit such as at 37.

The control circuit II comprises a second bridge rectifier 43 having its D. C. output terminals connected at 45 to the coil 11 of the electromagnet 9. The A. C. input terminals of the bridge rectifier 43 are connected by conductors 47 to the generator G, this generator G being an A. C. type generator, as, for example, a low-cost permanent-pole generator. An adjustable speed-setting resistor 49 is connected in series with the A. C. terminals of the bridge rectifier 43 and the generator G. The voltage impressed across the A. C. terminals of the bridge rectifier 43 may therefore be manually adjusted at the rheostat 49, for the purpose of providing a speed setting as will be made clear. It will be apparent that the voltage appearing across the output terminals at 45 should be maintained of a substantially pulsating nature, and therefore the inductance of the winding 11 should be insufficient to provide full ripple filtering action. That is, the output of the rectifier should be relatively poorly filtered and may have a ripple factor of the order of 20%. A sufficient ripple factor is required to vibrate the contacts 5 and 7.

Operation is as follows:

When power is first applied to the supply lines 23, full voltage is also applied to the field coil 1 of the coupling. A circuit is completed from the supply lines 23 through the conductors 21, the transformer 25, 27, the conductor 29, the switch contacts 5 and 7, the conductor 35 and the conductor 31 for the bridge rectifier 33. The bridge rectifier 33 in turn supplies direct current to the field coil 1. At this time, the generator is stationary and the contacts 5 and 7 are fully closed.

The resulting full excitation of coil 1 results in transmission of torque from the motor M through the coupling C to drive the generator G and the load L. As the output speed of the coupling C increases, the output voltage of the generator G increases proportionately. It may be noted that the frequency of the A. C. voltage output of the generator G also increases with speed, but such frequency increase has nominal effect upon the operation of this control system. At 1800 R. P. M., the generator may be delivering a voltage at a frequency of 420 cycles per second.

The bridge rectifier 43, being a full-wave rectifier, changes the A. C. voltage from the generator G to a pulsating D. C. voltage of twice the frequency of the generator output. The inductance of the winding 11 on the electromagnet 9 produces some ripple filtering action so that the output of the rectifier across conductors 45 might be said to consist of a D. C. component with full-wave rectified A. C. ripple pulses imposed thereon.

Figure 3:
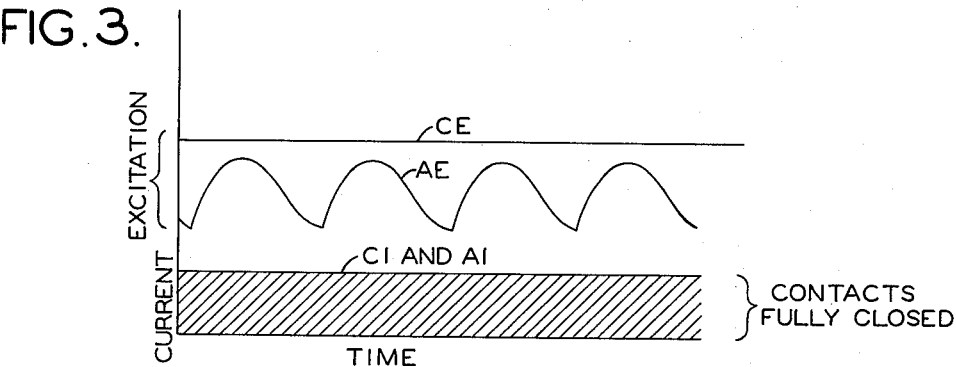
Figs. 3, 4, 5 and 6 are diagrams of excitation and current plotted as functions of time illustrating various conditions of operation of the electromagnetic vibrating contact device of my control system; and, Fig. 7 is a circuit diagram similar to that of Fig. 1 but including means for minimizing hunt.

At low speeds, the output of the generator is such that the magnetic field of the electromagnet 9 is insufficient to draw the contact 5 against the bias at 19 away from the contact 7. As a consequence, the load circuit I remains fully closed through the contacts 5 and 7, and this condition is illustrated in Fig. 3. In Fig. 3, the straight line designated CE represents a critical excitation of the electromagnet 9 that is required to open the contacts 5 and 7. The periodic wave AE represents the actual excitation of the electromagnet 9, and the straight line CI represents the load or contact current through the load circuit I, such load current being of a uniform maximum value when the contacts 5 and 7 are fully closed.

Figure 4:
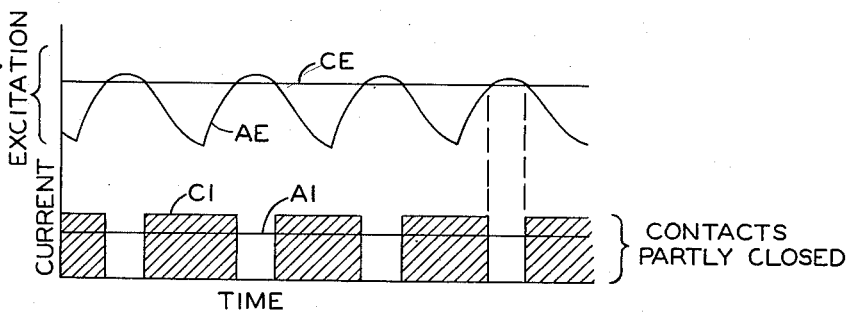
Figure 5:
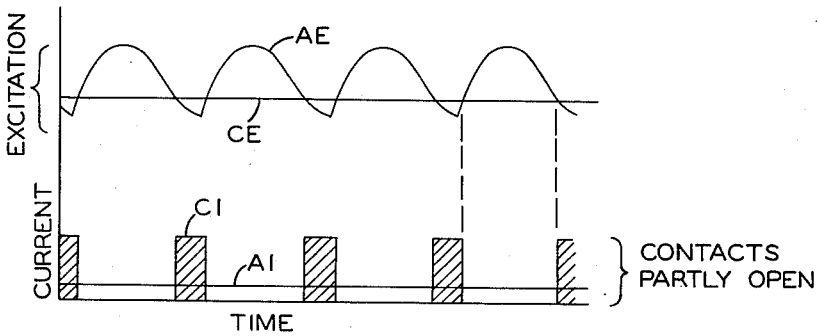

As the output speed of the coupling C continues to increase, the actual excitation of the electromagnet 9 at times periodically exceeds the critical value CE that is necessary to open the contacts 5 and 7. This condition is illustrated in Figs. 4 and 5. When the actual excitation voltage AE rises above the critical value CE, the contacts open, and when the actual excitation AE falls below the critical value CE the contacts close. As a consequence, the load current through the contacts appears in Figs. 4 and 5 as a series of pulses CI. Actually, the pulsating current occurs only in the A. C. portion of the load circuit between the transformer secondary 27 and the rectifier 33. The excitation for the field coil 1 is an inductively smoothed, substantially constant current AI of an amplitude corresponding to the average load current in the A. C. portion of the load circuit. The inductive smoothing is due to the large reactance of coil 1. This average value AI is less than the peak value of CI and accordingly is less for conditions illustrated in Fig. 4 than in Fig. 3, and less in Fig. 5 than in Fig. 4. The average current AI and consequently the excitation of the field coil 1 may be varied uniformly, depending upon the relation of the pulsating wave AE with the critical voltage CE.

Figure 6:
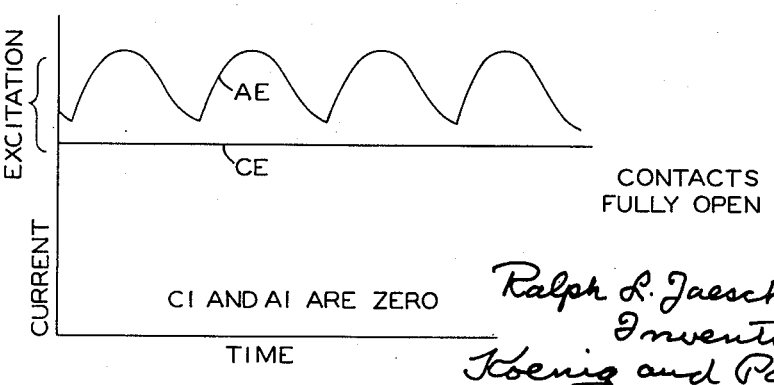

When the pulsating excitation AE for the electromagnet 9 exceeds the critical excitation CE at all times, as illustrated in Fig. 6, the contacts 5 and 7 remain open at all times, and the field coil 1 is deenergized. For simplicity of explanation, the power supply for the load circuit is assumed, as to Figs. 3–6, to be relatively constant over the time shown. Actually, the supply is preferably of an A. C. nature. Also for simplicity, the increase in the pulse frequency of wave AE accompanying increased speed of generator G has not been illustrated in detail in Figs. 4–6.

In operation, the output speed of the coupling increases until an equilibrium is reached between the speed necessary to produce a predetermined coupling excitation at field coil 1 and the field coil excitation that results in this output speed and generator output. It will be apparent that, as resistance is added to the control circuit II at rheostat 49, the equilibrium point is gradually reduced. The equilibrium point is therefore the set speed at which it is desired to operate the load. Accordingly, the load speed is pre-set at 49, and thereafter regulated by the variations in the voltage output of the generator G resulting from speed variations in the output speed of the coupling.

According to Fig. 1, the control system provides speed-setting and speed-regulating action. Additionally, torque-limiting action may be obtained by incorporating a second electromagnetic vibrating contact device 51 into the control system (see Fig. 2). The additional device 51 also has a pair of contacts 53 and 55, of which the contact 53 is a vibrating contact responsive to a pulsating excitation of a field coil 57 wound on an electromagnet 59. The field coil 57 is excited from a second control circuit III which includes a bridge rectifier 61, an adjustable resistor 63 and a current transformer 65 connected in one of the power supply lines 23 for the motor M.

The excitation of the electromagnet 59 is varied according to the current drawn by the motor M and the contacts 53 and 55 are accordingly responsive to the load on the motor M. Other types of load-detecting means may be employed. These contacts 53 and 55 are also connected in the A. C. portion of the load circuit I in series with the contacts 5 and 7, which provide speed-regulating and speed-setting control action.

In this alternative arrangement (Fig. 2), the operation is similar to that described heretofore, with the further fact that the speed-regulating action of contacts 5 and 7 may be overridden by the torque-limiting action of contacts 53 and 55. In other words, when the motor current exceeds a predetermined value, as pre-selected at 63, the contacts 53 and 55 are opened a sufficient amount over a relatively long time period so that the load current is restricted, even though the contacts 5 and 7 are operating to pass a relatively larger load current through the A. C. portion of the load circuit. In this sense, the motor M is protected against overload. Although two vibrating contact devices are shown, it will be understood that they could be combined into one device with separate electromagnets or windings for the two control circuits II and III.

Figure 7:
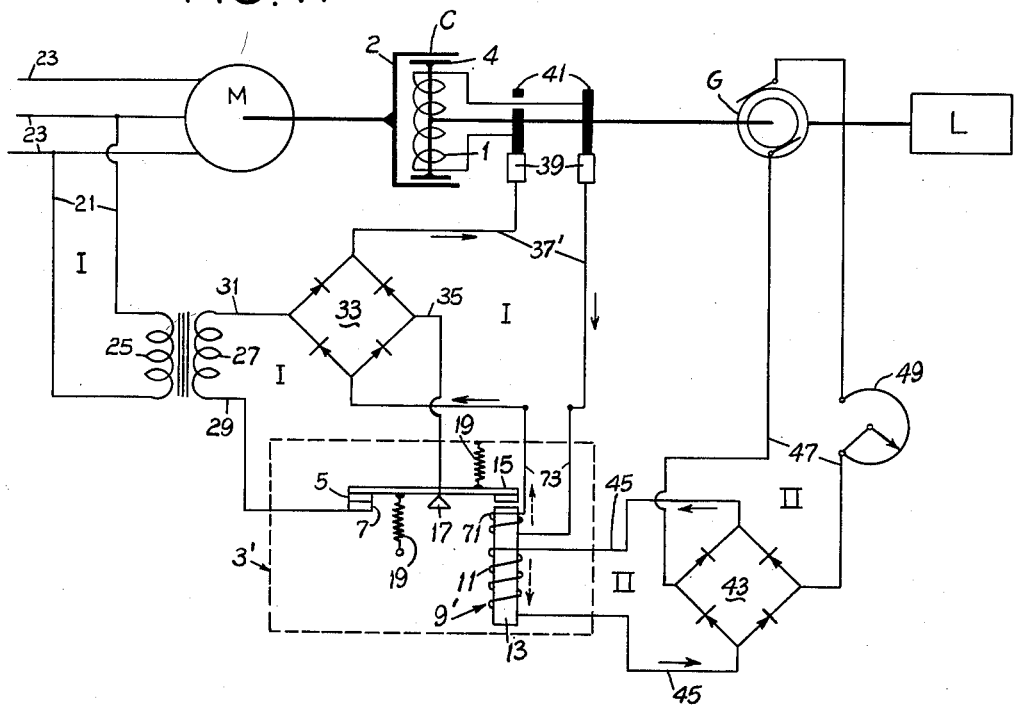

Improved stability may be obtained by using the control system shown in Fig. 7. The control system of this embodiment (Fig. 7) is identical to that shown in Fig. 1 with the exception the electromagnetic vibrating contact device 3' incorporates a second winding 71 in the electromagnet 9'. The winding 71 is of a relatively few turns, as compared to the winding 11, and is series connected at 73 in the D. C. part 37' of the load circuit I. Otherwise, the circuit (Fig. 7) is identical to that of Fig. 1, hence like reference characters are employed for like parts and the description is not repeated.

In one form of the system, the winding 11 has approximately 3500 turns of #30 wire, with the magnetization resulting therefrom being approximately 60 ampere turns, and the load-responsive winding 71 has 10 turns of wire of sufficient capacity to carry the normal D. C. load current. Being connected in the load circuit I, the winding 71 may be thought of as supplying a load-responsive component of excitation to the electromagnet. A degenerative effect is obtained by causing the magnetizing force supplied by the load-responsive winding 71 to be in a direction opposite to that supplied by the winding 11. In the drawing, the magnetizing forces of the windings 11 and 71 are indicated by dotted arrows. The desired effect may be attained either by winding the two coils in reverse directions with the currents running in the same direction, or by winding the coils in the same direction with the currents running in opposite directions, the latter being shown in the drawing.

The load-responsive winding 71 is effective during speed changes to avoid undershoot and overshoot in correcting for the speed changes. For example, if the output speed of the coupling transiently is decreased as by an increase in the load at L, the excitation at winding 11 is temporarily decreased. Contacts 5 and 7 are then closed a relatively larger amount so that increased current is supplied to the field coil 1 with the result that the slip at the coupling C is reduced and the speed of the load thereby increased to counteract the temporary increase at the output speed of the coupling. The excitation of the winding 71, however, also increases with the increase in the load current, and the effect of this winding 71 is such as to cause a decrease in the excitation in the load current. In other words, the load-responsive winding 51 opposes the effect of the control winding 11, and therefore may be said to have a degenerative controlling action.

This degenerative controlling action is desirable because of the time delay presented by the large reactance of the field coil 1. It is desirable to have a relatively large corrective force tending to produce a quick change in the field excitation at 1 initially, but as such change occurs to decrease the corrective force and thereby avoid overshoot of the correction. In this way, hunting is avoided. It will be understood that the load-responsive winding could be connected in the opposite direction so as to have a regenerative controlling effect, which would produce increased sensitivity, with some time delay, but the result then would be greater tendency to hunt.

The torque-limiting control system of Fig. 2 may also be provided with stabilizing action of the Fig. 7 embodiment by adding a winding such as 71 to either of the vibrating-contact devices 3 or 51.

From the above, it will be seen that the control systems of this invention are relatively simple and economical, the essential parts being simple electromagnetic vibrating contact devices and speed-detecting and torque-detecting means adapted to provide variable-amplitude pulsating excitation at the electromagnets.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. In a control system for varying the average current supplied to a load, a load circuit including a power supply connected to said load, an electromagnetic vibrating contact device comprising a pair of contacts connected in said load circuit and an electromagnet having first and second windings, one of the contacts being a biased contact movable against bias in response to excitation of the electromagnet, a variable-amplitude pulsating exciting source connected to said first winding, and connections from said load to said second winding for making the excitation of said electromagnet responsive to the load current.

2. In a control system for varying the average current supplied to a D. C. load, a load circuit including a D. C. portion connected to said load and supplied by D. C. power supply means, an electromagnetic vibrating contact device comprising a pair of contacts connected in said load circuit and an electromagnet having first and second windings, one of the contacts being a biased contact movable against bias in response to excitation of the electromagnet, a variable-amplitude pulsating exciting source connected to said first winding, and connections from the D. C. portion of said load circuit to said second winding providing a component of excitation for said electromagnet responsive to the load current.

3. A control as set forth in claim 2, wherein said second winding has a relatively small number of turns as compared with said first winding and is connected in the D. C. portion of the load circuit in series with the load.

4. A control system as set forth in claim 3, wherein the magnetizing force of said first winding is opposed by the magnetizing force of said second winding.

5. A control system as set forth in claim 4, wherein the electromagnetic device has a core upon which both windings are wound, the direction of the windings and the direction of current flow therethrough being such that the respective magnetizing forces of said first and second windings are in opposite direction.

6. In a regulating control system for an electric machine for varying the excitation of said machine in accordance with variations detected in a selected varying condition of the machine, a load circuit including a D. C. portion connected to said machine and supplied by D. C. power supply means, an electromagnetic vibrating contact device comprising a pair of contacts connected in said load circuit and an electromagnet having first and second windings, one of the contacts being a biased contact movable against bias in response to excitation of the electromagnet, means for detecting variations in selected varying condition connected to said first winding and providing a variable-amplitude pulsating excitation responsive in amplitude to variations in said selected varying condition, and connections from the D. C. portion of said load circuit to said second winding connecting the second winding in series with the load, the magnetizing force of said first winding being opposed by the magnetizing force of said second winding.

7. A control system as set forth in claim 6, wherein the means connected to the first winding comprises an A. C. generator driven by the machine and rectifier means, said generator and said rectifier means being connected to deliver a pulsating D. C. excitation to said first winding, which excitation is responsive in amplitude to the speed of the machine.

8. A control system for varying the average current supplied to a load, comprising an electromagnetic high-frequency vibrating device having an electromagnet, a winding therefor and a pair of contacts normally biased to a closed position, said contacts adapted to vibrate at a high frequency between closed and open positions upon sufficient energization of said winding, a control circuit connected to said winding comprising a source of high-frequency pulsating D. C. variable in amplitude, and a series circuit including said load, a power supply and said contacts, whereby a high-frequency series of current pulses are supplied to said load, the average load current being a function of pulse duration and the latter being dependent on the amplitude of said high-frequency pulsating D. C.

9. A control system as set forth in claim 8 wherein said load is a D. C. load.

10. A control system as set forth in claim 8 wherein said power source is an A. C. power source and the load is a rectifier and a D. C. coil.

11. A control system for varying the average current supplied to a load in accordance with variations detected in a selected varying condition, comprising an electromagnetic high-frequency vibrating device having an electromagnet, a winding therefor and a pair of contacts normally biased to a closed position, said contacts adapted to vibrate at a high frequency between closed and open positions upon sufficient energization of said winding, a control circuit connected to said winding comprising a source of high-frequency pulsating D. C. having an output responsive in amplitude to said selected varying condition, and a series circuit including said load, a power supply and said contacts, whereby a high-frequency series of current pulses are supplied to said load, the average load current being a function of pulse duration and the latter being dependent on the amplitude of said high-frequency pulsating D. C.

12. A control system as set forth in claim 11 wherein the high-frequency pulsating D. C. source comprises a source of variable-amplitude A. C. voltage and rectifier means connected thereto.

13. A control system as set forth in claim 11 wherein the control circuit further includes a manually adjustable resistance.

14. A control system for varying the average currents supplied to a D. C. load, comprising an electromagnetic high-frequency vibrating device having an electromagnet, a winding therefor and a pair of contacts normally biased to a closed position, said contacts adapted to vibrate at a high frequency between closed and open positions upon sufficient energization of said winding, a control circuit connected to said winding comprising a source of high-frequency pulsating D. C. variable in amplitude, and a power circuit including said load, a rectifier connected thereto and an A. C. power source, said contacts being series-connected between said A. C. source and said rectifier whereby a high-frequency series of current pulses are supplied to said load, the average load current being a function of pulse duration and the latter being dependent on the amplitude of said high-frequency pulsating D. C.

15. A control system for varying the average current supplied to a load in accordance with variations detected in at least two selected varying conditions, comprising first and second electromagnetic high-frequency vibrating devices each having an electromagnet, a winding therefor, and a pair of contacts normally biased to a closed position, said contacts adapted to vibrate at a high frequency between closed and open positions upon sufficient energization of their respective winding, a first control circuit connected to the winding of said first device comprising a source of high-frequency pulsating D. C. having an output responsive in amplitude to one of said selected varying conditions, a second control circuit connected to the winding for said second device comprising a second source of high-frequency pulsating D. C. having an output responsive in amplitude to the other of said selected varying conditions, and a series circuit including said load, a power supply and both sets of said contacts whereby a high-frequency series of current pulses are supplied to said load, the average load current being a function of the sum of pulse durations and the latter being dependent on the amplitudes of said high-frequency pulsating D. C. sources.

16. A control system as set forth in claim 15 wherein each of said high-frequency pulsating D. C. sources comprises a source of variable-amplitude A. C. voltage and rectifier means connected thereto.

17. A control system for regulating the speed of an electric machine having a D. C. field coil the excitation of which controls the speed of the machine, comprising an electromagnetic high-frequency vibrating device having an electromagnet, a winding therefor and a pair of contacts normally biased to a closed position, said contacts adapted to vibrate at a high frequency between closed and open positions upon sufficient energization of said winding, a control circuit connected to said winding comprising an A. C. generator driven by said machine and a rectifier therefor adapted to produce a high-frequency pulsating D. C. signal responsive in amplitude to machine speed, and a series circuit including said field coil, a power supply and said contacts, whereby a high-frequency series of current pulses are supplied to said field coil, the average field current being a function of pulse duration and the latter being dependent on the amplitude of said high-frequency pulsating D. C. signal.

18. A control system for a variable speed drive including an A. C. motor and a slip coupling wherein it is desired to limit the torque transmitted by the coupling, the coupling having a field coil controlling the torque transmitted by the coupling, comprising an electromagnetic high-frequency vibrating device having an electromagnet, a winding therefor and a pair of contacts normally biased to a closed position, said contacts adapted to vibrate at a high frequency between closed and open positions upon sufficient energization of said winding, a control circuit connected to said winding comprising a source of high-frequency pulsating D. C. responsive in amplitude to the current drawn by said A. C. motor, and a series circuit including said field coil, a power supply and said contacts, whereby a high-frequency series of current pulses are supplied to said coil, the average field current being a function of pulse duration and the latter being dependent on the amplitude of said high-frequency pulsating D. C.

19. A control system for a variable speed drive including an A. C. motor and a slip coupling wherein it is desired to limit the torque transmitted by the coupling and regulate the output speed of the coupling, the coupling having a field coil controlling torque and output speed, comprising first and second electromagnetic high-frequency vibrating devices each having an electromagnet, a winding therefor and a pair of contacts normally biased to a closed position, each pair of said contacts adapted to vibrate at a high frequency between closed and open positions upon sufficient energization of its respective winding, a first control circuit connected to the winding of said first device comprising an A. C. generator driven by said coupling and a rectifier therefor adapted to produce a high-frequency pulsating D. C. signal responsive in amplitude to coupling output speed, a second control circuit connected to the winding for said second device comprising an A. C. power supply and a second rectifier adapted to produce a second high-frequency pulsating D. C. signal responsive in amplitude to the current drawn by said A. C. motor, and a power circuit including said field coil, a third rectifier connected thereto, said A. C. power supply, and both sets of contacts, said pairs of contacts being series-connected between said A. C. source and said third rectifier, whereby a high-frequency series of current pulses are supplied to said coil, the average load current being a function of the sum of the pulse durations and the latter being dependent on the amplitudes of said high-frequency pulsating D. C. signals.

20. A control system for varying the average current supplied to a load, comprising an electromagnetic high-frequency vibrating device having an electromagnet, first and second windings therefor and a pair of contacts normally biased to a closed position, said contacts adapted to vibrate at a high frequency between closed and open positions upon sufficient composite energization of said windings, a control circuit connected to said first winding comprising a source of high-frequency pulsating D. C. variable in amplitude, and a series circuit including said load, a power supply, said second winding and said contacts, whereby a high-frequency series of current pulses are supplied to said load, the average load current being a function of pulse duration and the latter being dependent on the amplitude of said high-frequency pulsating D. C.

21. A control system as set forth in claim 20 wherein the magnetizing force of said first winding is opposed by the magnetizing force of said second winding.

22. A control system for varying the average current supplied to a load in accordance with variations detected in a selected varying condition, comprising an electromagnetic high-frequency vibrating device having an electromagnet, first and second windings therefor and a pair of contacts normally biased to a closed position, said contacts adapted to vibrate at a high frequency between closed and open positions upon sufficient composite energization of said windings, a control circuit connected to said first winding comprising a source of high-frequency pulsating D. C. having an output responsive in amplitude to said selected varying condition, and a series circuit including said load, a power supply, said second winding and said contacts, whereby a high-frequency series of current pulses are supplied to said load, the average load current being a function of pulse duration and the latter being dependent on the amplitude of said high-frequency pulsating D. C.

23. A control system for regulating the speed of an electric machine having a D. C. field coil the excitation of which controls the speed of the machine, comprising an electromagnetic high-frequency vibrating device having an electromagnet, first and second windings therefor and a pair of contacts normally biased to a closed position, said contacts adapted to vibrate at a high frequency between closed and open positions upon sufficient composite energization of said windings, a control circuit connected to said first winding comprising an A. C. generator driven by said machine and a rectifier therefor adapted to produce a high-frequency pulsating D. C. signal responsive in amplitude to machine speed, and a series circuit including said field coil, a power supply, said second winding and said contacts, whereby a high-frequency series of current pulses are supplied to said field coil, the average field current being a function of pulse duration and the latter being dependent on the amplitude of said high-frequency pulsating D. C. signal.

References Cited in the file of this patent

UNITED STATES PATENTS

| Number | Name | Date |
| --- | --- | --- |
| Re. 24,432 | Winther | Feb. 1, 1944 |
| 1,662,084 | Stoller | Mar. 13, 1928 |
| 2,021,196 | Oldham | Nov. 19, 1935 |

FOREIGN PATENTS

| Number | Country | Date |
| --- | --- | --- |
| 123,484 | Australia | Mar. 16, 1945 |
| 353,893 | Great Britain | July 22, 1931 |